(12) United States Patent
Inoue

(10) Patent No.: US 11,970,990 B1
(45) Date of Patent: Apr. 30, 2024

(54) CONTROL APPARATUS FOR VEHICLE

(71) Applicant: TOYOTA JIDOSHA KABUSHIKI KAISHA, Toyota (JP)

(72) Inventor: Toshio Inoue, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/449,795

(22) Filed: Aug. 15, 2023

(30) Foreign Application Priority Data

Oct. 7, 2022 (JP) ................................. 2022-162736

(51) Int. Cl.
*F02D 41/02* (2006.01)

(52) U.S. Cl.
CPC ....... *F02D 41/023* (2013.01); *F02D 41/0245* (2013.01); *F02D 2200/0802* (2013.01); *F02D 2200/0804* (2013.01)

(58) Field of Classification Search
CPC ............... F02D 41/023; F02D 41/0245; F02D 2200/0802; F02D 2200/0804; F02D 2041/0265; B60W 10/06; B60W 10/11; B60W 2510/068; B60W 2710/0694
See application file for complete search history.

(56) References Cited

U.S. PATENT DOCUMENTS

| 10,253,708 B2 * | 4/2019 | Watanabe | ............... F02D 37/02 |
| 2008/0287254 A1 * | 11/2008 | Nagai | ................... F02D 41/023 |
| | | | 701/102 |

FOREIGN PATENT DOCUMENTS

| JP | 2002038987 A | * | 2/2002 | |
| JP | 2010281408 A | * | 12/2010 | |
| JP | 2011017305 A | * | 1/2011 | ............. F02D 29/02 |
| JP | 2014-58907 A | | 4/2014 | |
| JP | 2016223392 A | * | 12/2016 | |

* cited by examiner

*Primary Examiner* — Sherry L Estremsky
(74) *Attorney, Agent, or Firm* — Oblon, McClelland, Maier & Neustadt, L.L.P.

(57) ABSTRACT

A control apparatus for a vehicle that includes a drive wheel, an engine and an automatic transmission configured to transmit power from the engine toward the drive wheel. When the automatic transmission is shifted, the control apparatus is configured to execute a shifting-time torque-down control by using an ignition retard method of retarding an ignition timing of the engine or a fuel cut method of restricting fuel supply to the engine. The control apparatus is configured to estimate a temperature of a predetermined portion of an exhaust pipe of the engine in a case in which the shifting-time torque-down control is executed by using the ignition retard method, and to execute the shifting-time torque-down control by using the fuel cut method when an estimated value of the temperature of the predetermined portion of the exhaust pipe is not lower than a predetermined upper-limit temperature value.

5 Claims, 5 Drawing Sheets

FIG.3

| | EXHAUST | FUEL EFFICIENCY | POWER PERFORMANCE | CONTROLLABILITY | | PARTS PROTECTION | |
|---|---|---|---|---|---|---|---|
| | | | | AIR | FUEL | CATALYST | TURBOCHARGER |
| IGNITION RETARD METHOD | △~× | △ | ○ | ○ | ○ | ○ | ○ |
| FUEL CUT METHOD | ○ | ○ | △ | △ | △ | △ | ○ |
| FUEL CUT METHOD + THROTTLE OPENING | ○ | ○ | △~○ | ○ | △ | △ | ○ |

(○:EXCELLENT △:FAIR ×:POOR)

CONTROL APPARATUS FOR VEHICLE

This application claims priority from Japanese Patent Application No. 2022-162736 filed on Oct. 7, 2022, the disclosure of which is herein incorporated by reference in its entirety.

FIELD OF THE INVENTION

The present invention relates to a control apparatus for a vehicle and, more particularly, to a control apparatus for a vehicle, which executes a shifting-time torque-down control when an automatic transmission is shifted.

BACKGROUND OF THE INVENTION

There is known a control apparatus for a vehicle that includes a drive wheel, an engine and an automatic transmission configured to transmit a power from the engine toward the drive wheel, wherein, when the automatic transmission is shifted, the control apparatus is configured to execute a shifting-time torque-down control by using one of an ignition retard method of retarding an ignition timing of the engine and a fuel cut method of restricting fuel supply to the engine. Patent Document 1 discloses an example of such a control apparatus in which the fuel cut method is used, wherein the fuel cut method includes a partial fuel cut control for stopping fuel supply to one or ones of cylinders of the engine and a closing control for reducing a throttle-valve opening degree. In addition, when a temperature related to an exhaust system of the engine is increased, a fuel increase control is executed to increase an amount of fuel supplied to the engine in order to suppress overheating, and when the fuel increase control is being executed during shifting of the transmission, the ignition retard method and the fuel cut method are switched based on an amount of change of the increase coefficient.

PRIOR ART DOCUMENT

Patent Document

[Patent Document 1]
Japanese Patent Application Laid-Open No. 2014-58907

SUMMARY OF THE INVENTION

However, when the temperature of the exhaust system is increased due to the shifting-time torque-down control executed using the ignition retard method during the shifting of the transmission, and the fuel increase control needs to be executed, there is a possibility that harmful gases such as HC and CO in an exhaust gas is increased due to the fuel increase control, and there is still room for improvement. Where the shifting-time torque-down control is executed with use of the fuel cut method, there is no risk of the overheating and accordingly the fuel increase control is unlikely executed. However, where the fuel cut method is used, control accuracy and responsiveness of an intake air amount and a fuel injection amount are poor, a rise of torque of the engine is delayed upon restart of the fuel supply after execution of the shift shifting-time torque-down control, so that power performance is likely to be poor as compared with the ignition retard method.

The present invention has been made in view of the above circumstances, and it is an object of the present invention to suppress execution of the fuel increase control for suppressing overheating caused by increase of a temperature of an exhaust system when the ignition retard method is used as a shifting-time torque-down control.

According to a first aspect of the present invention, there is provided a control apparatus for a vehicle that includes a drive wheel, an engine and an automatic transmission configured to transmit power from the engine toward the drive wheel. When the automatic transmission is shifted, the control apparatus is configured to execute a shifting-time torque-down control by using one of an ignition retard method of retarding an ignition timing of the engine and a fuel cut method of restricting fuel supply to the engine. When the shifting-time torque-down control is requested to be executed, the control apparatus is configured to estimate a temperature of a predetermined portion of an exhaust pipe of the engine in a case in which the shifting-time torque-down control is executed by using the ignition retard method, and to execute the shifting-time torque-down control by using the fuel cut method when an estimated value of the temperature of the predetermined portion of the exhaust pipe is not lower than a predetermined upper-limit temperature value.

According to a second aspect of the present invention, in the control apparatus according to the first aspect of the present invention, when executing the shifting-time torque-down control by using the fuel cut method, the control apparatus is configured to control an electronic throttle valve of the engine such that the electronic throttle valve is opened while the fuel supply is restricted.

According to a third aspect of the present invention, in the control apparatus according to the first aspect of the present invention, the temperature of the predetermined portion of the exhaust pipe is a temperature of a catalyst provided in the exhaust pipe. When a current value of the temperature of the catalyst is not lower than a predetermined deterioration temperature value at which deterioration of the catalyst is expected in a case in which the fuel cut method is used to execute the shifting-time torque-down control, the control apparatus is configured to execute the shifting-time torque-down control by using the ignition retard method regardless of whether the estimated value of the temperature is not lower than the upper-limit temperature value.

According to a fourth aspect of the present invention, in the control apparatus according to the first aspect of the present invention, the temperature of the predetermined portion of the exhaust pipe includes a temperature of a catalyst provided in the exhaust pipe and a temperature of an exhaust gas which is exhausted from the exhaust pipe and which rotates a turbine of a turbocharger provided in the engine. The control apparatus is configured to calculate an estimated value of the temperature of the catalyst and an estimated value of the temperature of the exhaust gas, and to determine whether or not the estimated values of the temperatures are not lower than the upper-limit temperature values separately predetermined for the catalyst and the exhaust gas. The control apparatus is configured to execute the shifting-time torque-down control by using the fuel cut method when at least one of the estimated values of the temperatures is not lower than a corresponding one of the upper-limit temperature values.

According to a fifth aspect of the present invention, in the control apparatus according to the first aspect of the present invention, there is provided an overheat-suppression control portion configured to execute a fuel increase control for increasing an amount of the fuel supply to the engine in order to suppress overheating of the predetermined portion of the exhaust pipe when the temperature of the predetermined portion of the exhaust pipe reaches a predetermined overheat-determination temperature value, wherein the predetermined upper-limit temperature is predetermined based on the overheat determination temperature value such that execution of the fuel increase control by the overheat-suppression control portion is suppressed.

In the control apparatus constructed as described above, the temperature of the predetermined portion of the exhaust pipe of the engine in the case in which the ignition retard method is used is estimated, and when the estimated value of the predetermined portion of the exhaust pipe is equal to or higher than the predetermined upper-limit temperature value, the shifting-time torque-down control is executed by using the fuel cut method. Therefore, by appropriately setting the upper-limit temperature value, it is possible to reduce frequency of execution of the fuel increase control for suppressing overheating, and to suppress increase of harmful gases such as HC and CO caused by the fuel increase.

In the control apparatus according to the second aspect of the present invention, when the shifting-time torque-down control is executed by using the fuel cut method, the electronic throttle valve of the engine is controlled to be opened while the fuel supply is restricted. Therefore, a predetermined intake air amount is secured even during execution of the shifting-time torque-down control by the fuel cut method, so that the engine torque can be quickly increased when the fuel supply is restarted after execution of the shifting-time torque-down control, thereby suppressing response delay.

In the control apparatus according to the third aspect of the present invention, when the temperature of the catalyst provided in the exhaust pipe is estimated and the shifting-time torque-down control is executed, if the current value of the temperature of the catalyst is equal to or higher than the predetermined deterioration temperature value, the shifting-time torque-down control is executed by using the ignition retard method regardless of whether or not the estimated value of the temperature is equal to or higher than the upper-limit temperature value. Therefore, although there is a possibility that the fuel increase control is executed due to overheating, it is possible to avoid deterioration of the catalyst due to a lean atmosphere as in the fuel cut method.

In the control apparatus according to the fourth aspect of the present invention, the estimated value of the temperature of the catalyst and the estimated value of the temperature of the exhaust gas are calculated, and it is determined whether or not the estimated values of the temperatures are equal to or higher than the upper-limit temperature values separately predetermined for the catalyst and the exhaust gas. When at least one of the estimated values of the temperatures is equal to or higher than a corresponding one of the upper-limit temperature values, the shifting-time torque-down control is executed by using the fuel cut method. Therefore, the execution of the fuel increase control for suppressing overheating is appropriately suppressed.

In the control apparatus according to the fifth aspect of the present invention, the overheat-suppression control portion is provided to execute the fuel increase control for suppressing overheating when the temperature of the predetermined portion of the exhaust pipe reaches the predetermined overheat-determination temperature value, wherein the predetermined upper-limit temperature value is predetermined based on the overheat-determination temperature value such that execution of the fuel increase control is suppressed. Therefore, it is possible to appropriately obtain the effect of the present invention, which is to reduce frequency of the execution of the fuel increase control and to suppress an increase in harmful gases such as HC and CO.

BRIEF DESCRIPTION OF THE DRAWINGS

FIG. 3 is a table showing characteristics of an ignition retard method and a fuel cut method in a comparative manner, wherein the ignition retard method and the fuel cut method can be selected by a torque-down control portion shown in FIG. 1.

DETAILED DESCRIPTION OF PREFERRED EMBODIMENTS

The engine is an internal combustion engine, such as a gasoline engine or a diesel engine, capable of reducing its torque by an ignition retard method and a fuel cut method. As the automatic transmission, for example, a stepped transmission such as a planetary gear type or a two shaft meshing type in which a plurality of gear positions providing respective different gear ratios are selectively established is suitably used, but a continuously variable transmission such as a belt type in which a gear ratio is continuously variable can also be used. The shifting-time torque-down control is employed to quickly reduce a rotational speed of the engine, particularly, in a power-ON upshift for switching to a high-speed gear position providing a low gear ratio in a drive-power generation state (power-ON state). However, also in a power-ON downshift, the torque-down control is executed shortly before completion of the power-ON downshift, for example. That is, the present invention is applicable to the shifting-time torque-down control that is executed in any kinds of shifting of the transmission.

According to the present invention, when the shifting-time torque-down control is requested to be executed, the temperature of the predetermined portion of the exhaust pipe of the engine in the case in which the ignition retard method is used is estimated. When the estimated temperature of the predetermined portion of the exhaust pipe is equal to or higher than the predetermined upper-limit temperature value, the shifting-time torque-down control is executed by using the fuel cut method. For example, the ignition retard method, which is excellent in control accuracy and responsiveness of the intake air amount and the fuel injection amount, may be used. However, since the ignition retard method and the fuel cut method have advantages and disadvantages, respectively, one of the ignition retard method and the fuel cut method may be selected based on, for example, a driving state and a driving condition of the vehicle at that time and also a driving intention of a driver of the vehicle.

When the shifting-time torque-down control is executed by using the fuel cut method, it is desirable to execute an opening control for opening the electronic throttle valve while restricting the fuel supply to the engine. The temperature of the predetermined portion of the exhaust pipe is, for example, the temperature of the catalyst provided in the exhaust pipe or the temperature of the exhaust gas which is exhausted from the exhaust pipe and which rotates the turbine of the turbocharger provided in the engine, and one or both of these temperatures can be used as a target, but may be a temperature of another component or the like provided in the exhaust pipe. Instead of the exhaust gas for rotating the turbine, the temperature of the turbine itself may be used or the temperature of the exhaust pipe may be used.

Embodiments

Figure 1:
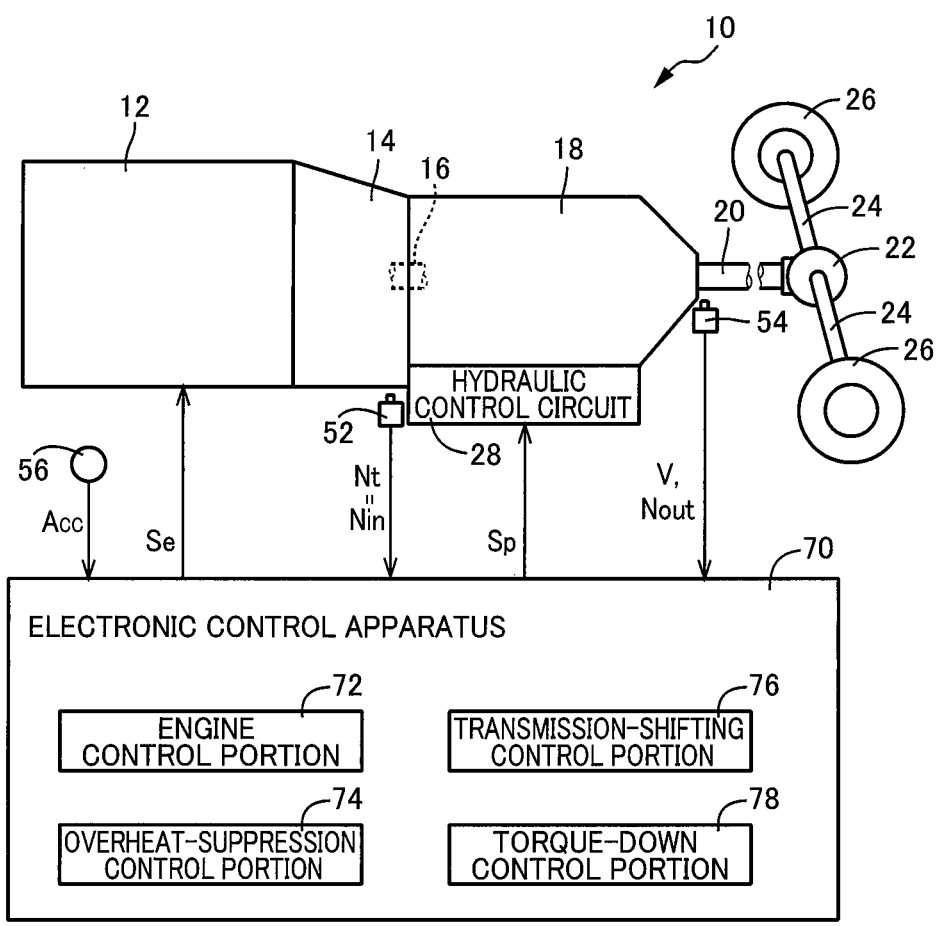
FIG. 1 is a view schematically showing a vehicle driving apparatus including a control apparatus according to an embodiment of the present invention.
Figure 2:
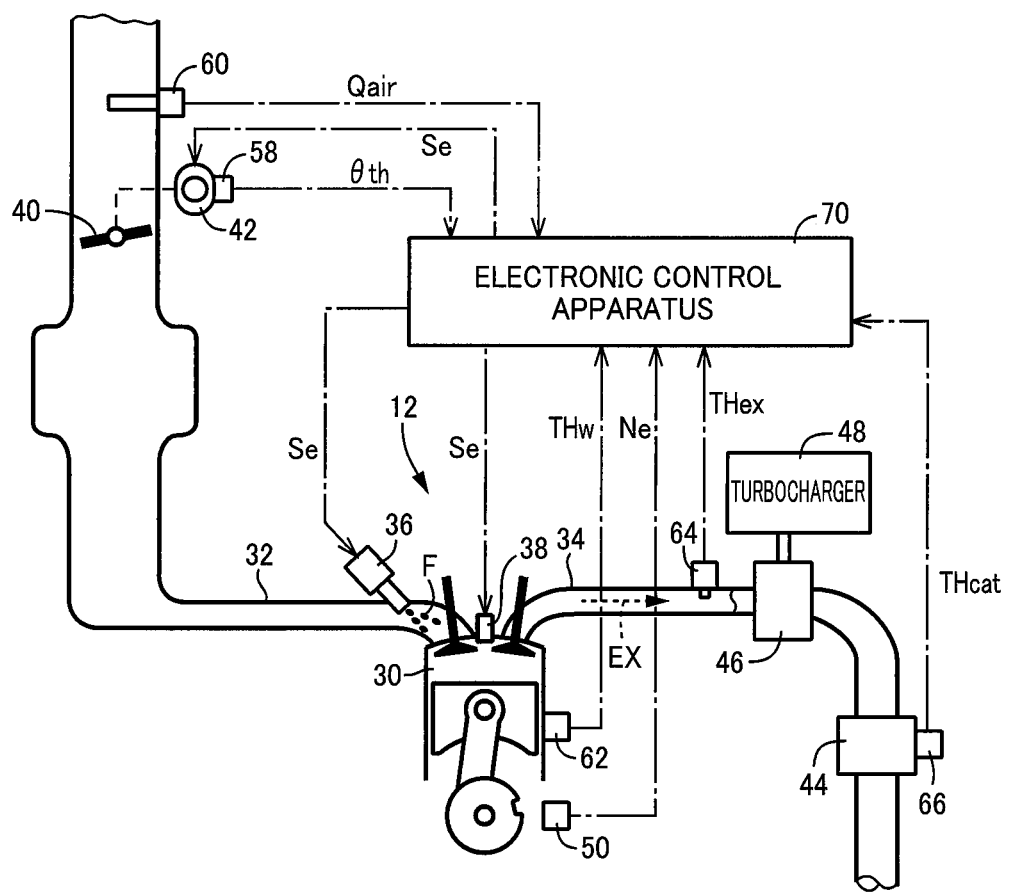
FIG. 2 is a view schematically showing an engine shown in FIG. 1.

Embodiments of the present invention will be described in detail below with reference to the drawings. FIG. 1 is a view schematically showing a driving apparatus of a vehicle 10 including an electronic control apparatus 70 as a control apparatus according to an embodiment of the present invention, and also a main part of a control system provided in the vehicle 10. FIG. 2 is a view schematically showing an engine 12 shown in FIG. 1, and also a main part of a control system provided in the vehicle 10 for controlling an output of the engine 12. The vehicle 10 is an engine-drive vehicle including only the engine 12 as a power source for driving the vehicle 10, and a power generated by the engine 12 is inputted to an input shaft 16 of an automatic transmission 18 via a torque converter 14, and is transmitted from an output shaft 20 of the automatic transmission 18 to right and left drive wheels 26 sequentially via a differential gear device 22 and a pair of axles 24, for example.

The engine 12 is a known gasoline engine for a vehicle, wherein the engine includes a plurality of cylinders, for example. As shown in FIG. 2, the engine 12 includes an intake pipe 32 connected to an intake port of a combustion chamber 30, an exhaust pipe 34 connected to an exhaust port of the combustion chamber 30, a fuel injection device 36 for injecting and supplying a fuel F into intake an air drawn into the combustion chamber 30, and an ignition device 38 for igniting an air-fuel mixture in the combustion chamber 30, wherein the air-fuel mixture is composed of the fuel F injected and supplied by the fuel injection device 36 and the drawn air. The intake pipe 32 of the engine 12 is provided with an electronic throttle valve 40, which is opened and closed by a throttle actuator 42. In the engine 12, the fuel F is injected and supplied from the fuel injection device 36 to the intake air taken into the combustion chamber 30 from the intake pipe 32 to form the air-fuel mixture, and the air-fuel mixture is ignited by the ignition device 38 so as to be burned and exploded in the combustion chamber 30. As a result, a piston of the engine 12 is driven up and down and a crankshaft of the engine 12 is rotated, while the air-fuel mixture after its combustion is discharged as an exhaust gas EX to an outside through the exhaust pipe 34.

The exhaust pipe 34 of the engine 12 is provided with a catalyst 44, so that the exhaust gas EX generated by the combustion in the engine 12 flows into the catalyst 44 through the exhaust pipe 34 so as to be purified by the catalyst 44, and is then discharged into an atmosphere. The catalyst 44 includes, for example, a well-known three-way catalyst that purifies hydrocarbon (HC), carbon monoxide (CO), nitrogen oxide (NOx) and the like in the exhaust gas EX. The exhaust pipe 34 is also provided with a turbine drive portion 46 between the engine 12 and the catalyst 44, so that a turbine of a turbocharger 48 disposed across the exhaust pipe 34 and the intake pipe 32 is driven and rotated by the exhaust gas EX.

The automatic transmission 18 constitutes a part of a power transmission path from the engine 12 to the drive wheels 26, and transmits the power from the engine 12 toward the drive wheels 26. The automatic transmission 18 is, for example, a known planetary gear type automatic transmission that selectively establishes a plurality of gear positions providing respective different speed ratios by shifting gears by switching any of a plurality of engagement devices, that is, by switching between engagement and disengagement of the engagement devices. That is, the automatic transmission 18 is a stepped transmission that performs a so-called clutch-to-clutch shift, and changes speed of rotation inputted to the input shaft 16 and outputs the rotation from the output shaft 20. The input shaft 16 is also a turbine shaft that is driven and rotated by a turbine impeller of the torque converter 14. The plurality of engaging devices are hydraulic frictional engaging devices, such as clutches and brakes, which are controlled to be engaged and disengaged by a hydraulic control circuit 28, such that their torque capacities, i.e., engaging forces, are changed by pressure adjustment of solenoid valves or the like in the hydraulic control circuit 28, so as to selectively connect and disconnect between members provided on respective opposite sides of each of the engaging devices.

The vehicle 10 is provided with the electronic control apparatus 70 that executes, for example, a control for controlling the output of the engine 12 and a control for controlling shifting of the automatic transmission 18, for example. The electronic control apparatus 70 includes, for example, a so-called microcomputer including a CPU, a RAM, a ROM and an input/output interface. The CPU performs various controls of the vehicle 10 by performing signal processing in accordance with a program stored in advance in the ROM while using a temporary storage function of the RAM. The electronic control apparatus 70 is configured separately for the engine control and the shift control, for example, as needed. The electronic control apparatus 70 corresponds to a control apparatus for the vehicle 10.

The electronic control apparatus 70 receives signals supplied from an engine speed sensor 50, a transmission input speed sensor 52, a transmission output speed sensor 54, an accelerator opening-degree sensor 56, a throttle-valve opening degree sensor 58, an air flow meter (intake air flow-rate sensor) 60, a coolant temperature sensor 62, an exhaust-gas temperature sensor 64 and a catalyst temperature sensor 66, for example. The signals supplied from these sensors represent various information required for the various controls, such as an engine speed Ne representing a rotational speed of the engine 12, a turbine speed Nt, i.e., a transmission input speed Nin representing a rotational speed of the input shaft 16, a transmission output speed Nout representing a rotational speed of the output shaft 20 corresponding to a running speed V of the vehicle 10, an accelerator opening degree Acc that is an operation amount of an accelerator pedal or the like representing the drive power (i.e., drive torque) of the vehicle 10 requested by a drive of the vehicle 10, a throttle-valve opening degree θth representing the opening angle of the electronic throttle valve 40, an intake air amount Qair of the engine 12, a coolant temperature THw of the engine 12, an exhaust gas temperature THex representing a temperature of the exhaust gas EX on an upstream side of the turbine drive portion 46 (i.e., exhaust gas EX that is to be flown into the turbine drive portion 46) and a catalyst temperature THcat. The electronic control apparatus 70 outputs, for example, an engine control command signal Se for controlling the output of the engine 12, and a hydraulic control command signal Sp for operating the hydraulic control circuit 28 that controls hydraulic actuators of the automatic transmission 18.

The electronic control apparatus 70 functionally includes an engine control portion 72, an overheat-suppression control portion 74, a transmission-shifting control portion 76 and a shifting-time torque-down control portion 78.

The engine control portion 72 applies the accelerator opening degree Acc and the vehicle running speed V to a drive request amount map, for example, so as to calculate a drive request amount for the vehicle 10 requested by the vehicle driver. The drive request amount is, for example, a request drive torque Trdem of the drive wheels 26. The engine control portion 72 obtains a required input torque Tindem, which is an input torque of the torque converter 14 required to realize the required drive torque Trdem, from a gear ratio of the automatic transmission 18 and a torque ratio of the torque converter 14, for example, and controls the engine 12 so as to obtain the required input torque Tindem. Specifically, the engine control command signal Se is outputted to control opening and closing of the electronic throttle valve 40 by the throttle actuator 42 such that an engine torque Te, which is a torque of the engine 12, becomes the required input torque Tindem, to control a fuel injection amount (fuel supply amount) by the fuel injection device 36 for a fuel injection control to each cylinder of the engine 12, and to control the ignition device 38 for an ignition timing control.

When the temperature related to the exhaust system of the engine 12 is increased, the overheat-suppression control portion 74 executes a fuel increase control for increasing the fuel injection amount to the engine 12. To be more specific, the catalyst temperature THcat, which is the temperature of the catalyst 44, is used as the temperature related to the exhaust system of the engine 12, and the fuel increase control is executed when the catalyst temperature THcat becomes equal to or higher than a predetermined overheat-determination temperature value THcath for determining that the catalyst 44 has such a high temperature that the purification capacity of the catalyst 44 is reduced. In the fuel increase control in this case, the fuel injection amount (command value) when the fuel increase control is not executed is multiplied by a predetermined increase coefficient Kcat (>1) to increase the fuel injection amount, thereby reducing the exhaust gas temperature THex and cooling the catalyst 44. The increase coefficient Kcat is set to a value dependent on variables such as an ignition retard amount Φ, the accelerator opening degree Acc and the throttle valve opening degree θth, such that the increase coefficient Kcat becomes larger as an ignition timing of the engine 12 is more largely retarded (as the ignition retard amount Φ is larger), and such that the increase coefficient Kcat becomes larger as the accelerator opening degree Acc or the throttle valve opening degree θth become larger. That is, as the ignition retard amount Φ, the accelerator opening degree Acc or the throttle valve opening degree θth becomes larger, for example, the increase coefficient Kcat becomes larger and accordingly the fuel increase amount becomes larger. The catalyst temperature THcat is detected by the catalyst temperature sensor 66, but it is also possible to use an estimated value calculated from the intake air amount Qair, the engine rotation speed Ne or the like corresponding to a load applied to the engine 12, or calculated from the exhaust gas temperature THex.

The overheat-suppression control portion 74 also uses an exhaust gas temperature THex, which is the temperature of the exhaust gas EX, as a temperature related to the exhaust system of the engine 12, and executes the fuel increase control when the exhaust gas temperature THex becomes equal to or higher than a predetermined overheat-determination temperature value THexh for determining that the exhaust gas temperature THex is high enough to impede or damage the operation of the turbine drive portion 46. In this instance, the fuel increase control is executed to decrease the exhaust gas temperature THex with the fuel injection amount (when the fuel increase control is not executed) with being multiplied by a predetermined increase coefficient Kex (>1) to increase the fuel injection amount. Like the increase coefficient Kcat, the increase coefficient Kex is set to a value dependent on variables such as the ignition retard amount Φ, the accelerator opening degree Acc and the throttle valve opening degree θth. Although the exhaust gas temperature THex is detected by the exhaust-gas temperature sensor 64, it is also possible to use an estimated value calculated from, for example, the intake air amount Qair, the engine rotation speed Ne or the like corresponding to the load applied to the engine 12.

The transmission-shifting control portion 76 executes the shift control of the automatic transmission 18. Specifically, it is determined whether the automatic transmission 18 is to be shifted or not depending on an actual state of the vehicle 10, using, for example, a shift map or the like stored in advance with the vehicle running speed V and the accelerator opening degree Acc as variables. When it is determined that the automatic transmission 18 should be shifted, the automatic shift control of the automatic transmission 18 is executed such that a required gear position is established. Specifically, the hydraulic control command signal Sp for engaging and/or releasing the engagement devices involved in the shifting of the automatic transmission 18 is outputted to the hydraulic control circuit 28 such that the required gear position is established.

Here, in order to appropriately advance the shifting (in particular, the power-ON upshift) of the automatic transmission 18 by the transmission-shifting control portion 76, it is an effective method to execute the shifting-time torque-down control for reducing the engine torque Te at a time of the shifting. Therefore, the electronic control apparatus 70 is functionally provided with a torque-down control portion 78 that executes the shifting-time torque-down control so as to reduce an inertia torque during an inertia phase when the transmission-shifting control portion 76 shifts the automatic transmission 18.

As the shifting-time torque-down control by the torque-down control portion 78, an ignition retard method of retarding the ignition timing of the engine 12 by the ignition device 38, and a fuel cut method of stopping injection of the fuel supplied to at least one cylinder of the engine 12 by the fuel injection device 36 are used. As the fuel cut method, the fuel supply by the fuel injection device 36 may be restricted by performing a closing control (also referred to as an electronic-throttle closing control) for reducing the throttle-valve opening degree θth of the electronic throttle valve 40. It is also possible to reduce a torque step by performing an ignition retardation for a short time immediately before the fuel supply is restricted by the fuel cut method. Further, in case of the fuel cut method, since the control accuracy and responsiveness of the intake air amount Qair are poor, the rise of the engine torque Te is delayed when the fuel supply is restarted after execution of the shifting-time torque-down control. Therefore, in case of using the fuel cut method, the electronic throttle valve 40 may be controlled to be opened while the fuel supply is being restricted. When the electronic throttle valve 40 is controlled to be opened in this way, a cooling effect can also be obtained by the intake air.

FIG. 3 is a table showing characteristics such as advantages and disadvantages of the ignition retard method, the fuel cut method, and the fuel cut method with use of a throttle opening control of the electronic throttle valve 40, in a comparative manner. That is, since the exhaust gas temperature THex is increased in the ignition retard method, if the catalyst temperature THcat reaches the overheat-determination temperature value THcath or the exhaust gas temperature THex reaches the overheat-determination temperature value THexh during high-load operation such as start and rapid acceleration and the fuel increase control is executed by the overheat-suppression control portion 74, an amount of harmful gases such as HC and CO in the exhaust gas EX is likely to be increases due to the fuel increase. On the other hand, in the fuel cut method, the control accuracy and responsiveness of the intake air amount Qair and the fuel injection amount are poor, so that the rise of the engine torque Te is delayed when the fuel supply is restarted after execution of the shifting-time torque-down control. Thus, the power performance is impaired as compared with the ignition retard method, and the catalyst 44 could be deteriorated at a high temperature due to a lean atmosphere.

Figure 4:
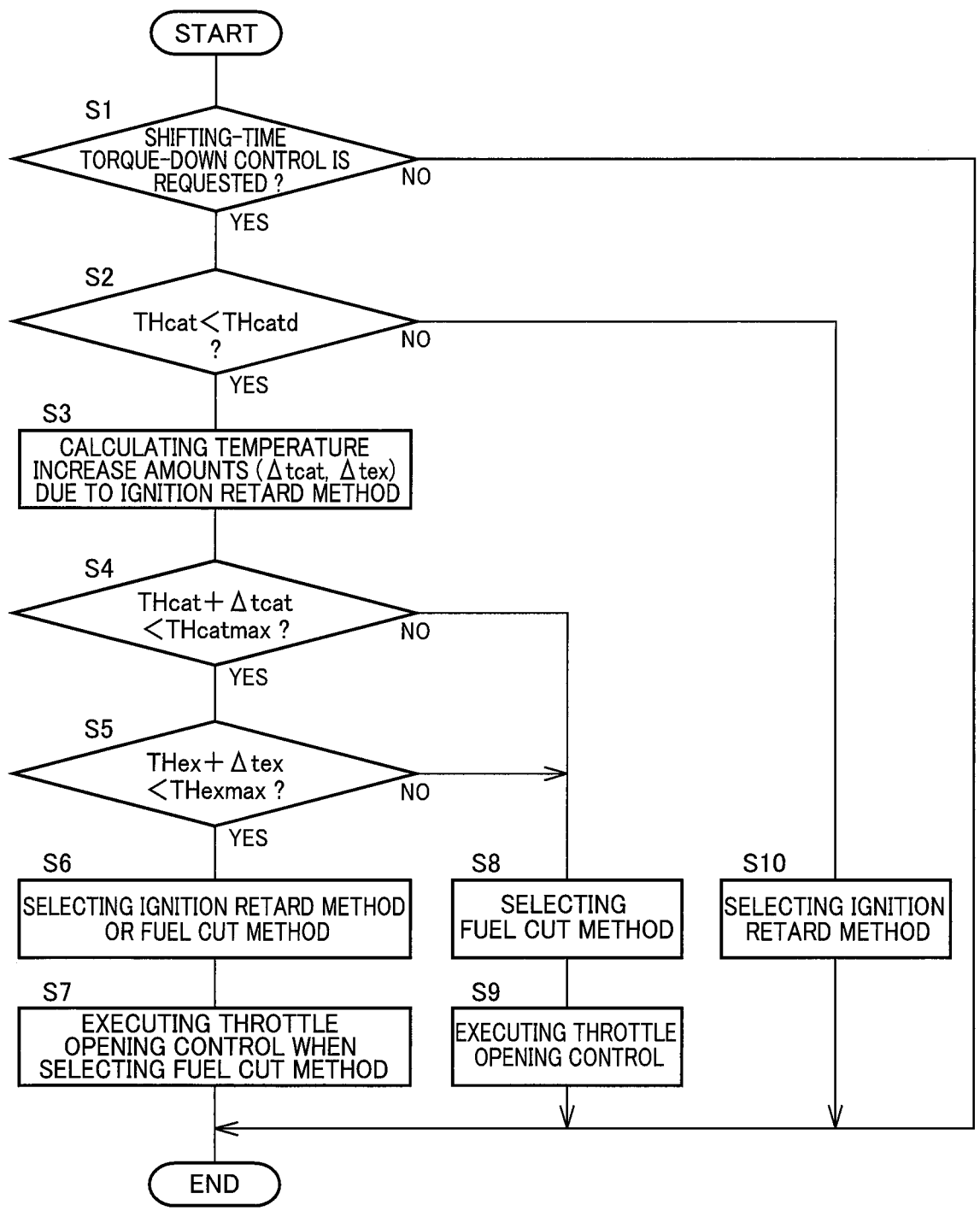
FIG. 4 is a flowchart for explaining an operation of the torque-down control portion shown in FIG. 1.

In consideration of the characteristics shown in FIG. 3, the torque-down control portion 78 executes a control routine including steps S1 through S10 as shown in flowchart of FIG. 4. As a result, the torque reduction control is executed at the time of the shifting of the automatic transmission 18, by selecting the ignition retard method or the fuel cut method. In the flowchart of FIG. 4, "YES" and "NO" in each of determination steps S1, S2, S4 and S5 (represented by rhombus shapes) represent affirmative determination and negative determination, respectively.

In step S1 of FIG. 4, it is determined whether or not there is a request for the shifting-time torque-down control. That is, at the time of the power-ON upshift of the automatic transmission 18 by the transmission-shifting control portion 76, for example, a request for the shifting-time torque-down control for reducing the engine torque Te is made to the torque-down control portion 78. If there is no request for the shifting-time torque-down control, one cycle of execution of the control routine is terminated. If there is the request for the shifting-time torque-down control, step S2 and the subsequent steps are implemented. In step S2, it is determined whether or not the catalyst temperature THcat representing a current temperature of the catalyst 44 is lower than a predetermined lean-deterioration temperature value THcatd. The lean-deterioration temperature value THcatd is a temperature value at which the catalyst 44 is likely be deteriorated in the lean atmosphere when the shifting-time torque-down control is executed by the fuel cut method. The lean-deterioration temperature value THcatd is set to a predetermined constant value, for example. When the catalyst temperature THcat is lower than the lean-deterioration temperature value THcatd (THcat<THcatd), step S3 and the subsequent steps are implemented. When the catalyst temperature THcat is not lower than the lean-deterioration temperature value THcatd (THcat≥THcatd), the fuel cut method causing the lean atmosphere is prohibited, and accordingly the shifting-time torque-down control is executed with the ignition retard method being selected at step S10. In this case, when the catalyst temperature THcat is increased to reaches the overheat-determination temperature value THcath, the fuel increase control is executed by the overheat-suppression control portion 74, so that, although there is a possibility that harmful gases such as HC and CO could be increased in the exhaust gas EX, it is possible to avoid deterioration of the catalyst 44 due to the lean atmosphere that is caused in the fuel cut method.

In step S3, a temperature increase amount Δ tcat of the catalyst temperature THcat and a temperature increase amount Δ tex of the exhaust gas temperature THex are calculated on an assumption that the shifting-time torque-down control is executed by using the ignition retard method. These temperature increase amounts Δ tcat and Δ tex can be obtained based on the actual vehicle state, for example, using a map or the like pre-defined with variables such as the engine rotation speed Ne, the intake air amount Qair and the ignition retard amount Φ. Then, in step S4, an estimated value (THcat+Δ tcat) of the catalyst temperature THcat is obtained by adding the temperature increase amount Δ tcat to the catalyst temperature THcat at the current time point, and it is determined whether or not the estimated value (THcat+Δ tcat) of the catalyst temperature THcat is lower than a predetermined upper-limit temperature value THcatmax. The upper-limit temperature value THcatmax is determined based on the overheat-determination temperature value THcath such that the execution of the fuel increase control by the overheat-suppression control portion 74 is suppressed. The upper-limit temperature value THcatmax is set to, for example, a value equal to or lower than the overheat-determination temperature value THcath by a predetermined value. When the estimated value (THcat+Δ tcat) of the catalyst temperature THcat is lower than the upper-limit temperature value THcatmax ((THcat+Δ tcat)<THcatmax), the control flow goes to step S5. When the estimated value (THcat+Δ tcat) of the catalyst temperature THcat is not lower than the upper-limit temperature value THcatmax ((THcat+Δ tcat)≥THcatmax), the control flow goes to step S8 in which the fuel cut method is selected. Step S8 is followed by step S9 that is implemented to execute the throttle opening control for opening the electronic throttle valve 40 by a predetermined opening degree so as to execute the shifting-time torque-down control. By using the fuel cut method in this way, it is possible to suppress execution of the fuel increase control by the overheat-suppression control portion 74 as a result of increase of the catalyst temperature THcat (as in a case in which the ignition retard method is used), and accordingly to suppress increase of harmful gases such as HC and CO in the exhaust gas EX.

In step S5, an estimated value (THex+Δ tex) of the exhaust gas temperature THex is obtained by adding the temperature increase amount Δ tex to the exhaust gas temperature THex at the current time point, and it is determined whether or not the estimated value (THex+Δ tex) of the exhaust gas temperature THex is lower than a predetermined upper-limit temperature value THexmax. The upper-limit temperature value THexmax is determined based on the overheat-determination temperature value THexh such that the execution of the fuel increase control by the overheat-suppression control portion 74 is suppressed. The upper-limit temperature value THexmax is set to, for example, a value equal to or lower than the overheat-determination temperature value THexh by a predetermined value. When the estimated value (THex+Δ tex) of the exhaust gas temperature THex is lower than the upper-limit temperature value THexmax ((THex+Δ tex)<THexmax), the control flow goes to step S6. When the estimated value (THex+Δ tex) of the exhaust gas temperature THex is not lower than the upper-limit temperature value ((THex+Δ tex)≥THexmax), the control flow goes to step S8 in which the fuel cut method is selected. Step S8 is followed by step S9 that is implemented to execute the throttle opening control for opening the electronic throttle valve 40 by the predetermined opening degree so as to execute the shifting-time torque-down control. By using the fuel cut method in this way, it is possible to suppress execution of the overheat-suppression control portion 74 as a result of increase of the exhaust gas temperature THex (as in a case in which the ignition retard method is used), and accordingly to suppress increase of harmful gases such as HC and CO in the exhaust gas EX.

When affirmative determinations are made both in steps S4 and S5, step S6 is implemented to select one of the ignition retard method and the fuel cut method. When the fuel cut method is selected at step S6, step S7 is implemented to execute the throttle opening control for opening the electronic throttle valve 40 by a predetermined opening degree so as to execute the shifting-time torque-down control. In step S6, the selection of the one of the ignition retard method and the fuel cut method is made based on, for example, a driving state and a driving condition of the vehicle 10 at that time and also a driving intention of the vehicle driver. For example, where the vehicle driver can select particular modes such as a fuel-efficiency priority mode and a sport mode, the fuel cut method excellent in a fuel efficiency may be selected when the fuel-efficiency priority mode is selected by the vehicle driver, and the ignition retard method excellent in a power performance may be selected when the sport mode is selected by the vehicle driver.

As described above, when the shifting-time torque-down control is requested to be executed, the torque-down control portion 78 estimates the temperatures of the predetermined portion of the exhaust pipe 34 of the engine 12 in the case in which the shifting-time torque-down control is executed by using the ignition retard method. When the estimated values (THcat+Δ tcat), (THex+Δ tex) of the respective catalyst temperature THcat and exhaust gas temperature THex are equal to or higher than the predetermined upper-limit temperature values THcatmax, THexmax (negative determination in step S4 or S5), step S8 is implemented to execute the shifting-time torque-down control by selecting the fuel cut method. Therefore, by appropriately setting the upper-limit temperature values THcatmax, THexmax, it is possible to reduce frequency of execution of the fuel increase control by the overheat-suppression control portion 74, and to suppress increase of the harmful gas such as HC and CO caused by the fuel increase. In the present embodiment, the upper-limit temperature values THcatmax, THexmax are determined based on the overheat-determination temperature values THcath, THexh of the overheat-suppression control portion 74, such that the execution of the fuel increase control by the overheat-suppression control portion 74 is appropriately suppressed.

When the shifting-time torque-down control is executed by using the fuel cut method, the electronic throttle valve 40 is controlled to be opened while the fuel supply is restricted at steps S7 and S9. Therefore, the predetermined intake air amount Qair is secured even during execution of the shifting-time torque-down control by the fuel-cut method, so that the engine torque Te can be quickly increased when the fuel supply is restarted after execution of the shifting-time torque-down control, thereby suppressing response delay.

When the current temperature THcat of the catalyst 44 is equal to or higher than the lean-deterioration temperature value THcatd (negative determination in step S2), regardless of whether the estimated value (THcat+Δ tcat) of the catalyst temperature THcat is equal to or higher than the upper limit temperature THcatmax, the ignition retard method is selected in step S10 and the shifting-time torque-down control is executed.

Figure 5:
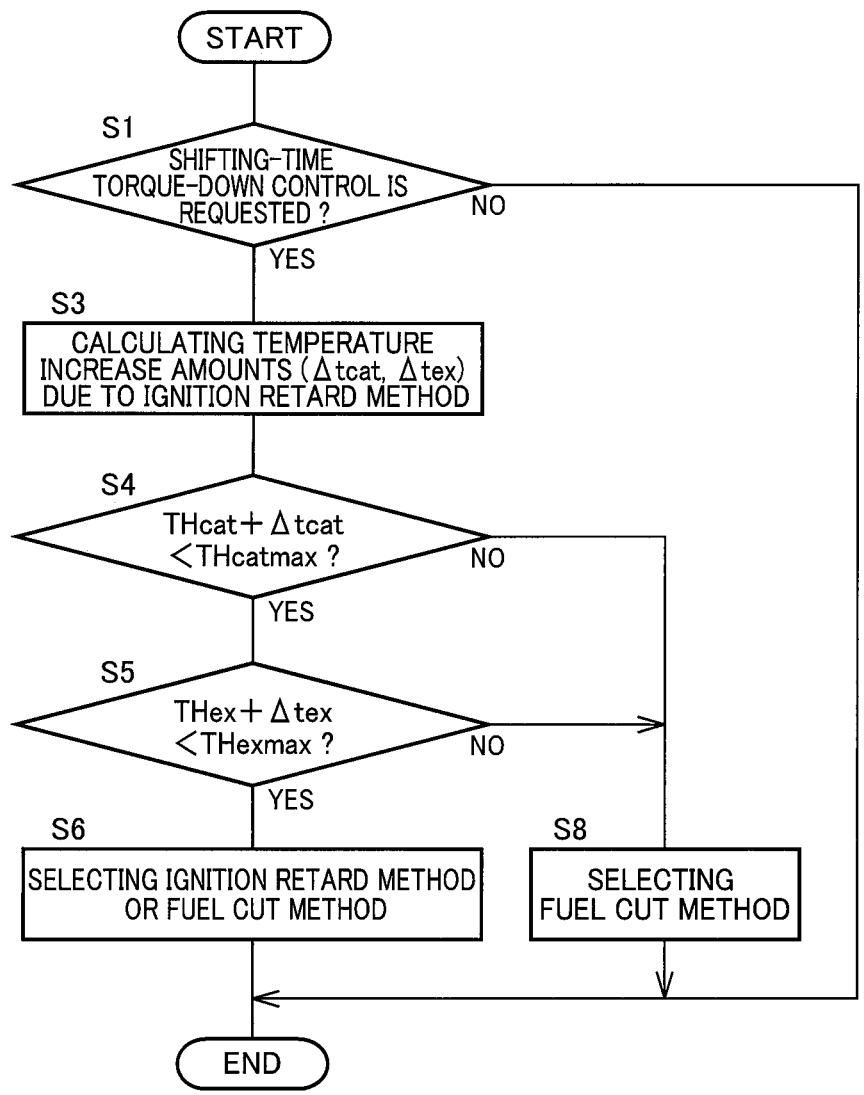
FIG. 5 is a flowchart for explaining an operation of the torque-down control portion in another embodiment of the present invention.

When at least one of the estimated value (THcat+Δ tcat) of the catalyst temperature THcat of the catalyst 44 and the estimated value (THex+Δ tex) of the the exhaust gas temperature THex of the exhaust gas EX is equal to or higher than a corresponding one of the upper-limit temperature values THcatmax, THexmax determined separately for the catalyst 44 and the exhaust gas EX (negative determination in step S4 or S5), the fuel cut method is selected in step S8 to perform the shifting-time torque-down control, so that the execution of the fuel increase control by the overheat-suppression control portion 74 is appropriately suppressed.

Where the present invention is carried out, the above-described steps S2, S7, S9 and S10 may be omitted, for example, as shown in a flowchart of FIG. 5.

Although the embodiments of the present invention have been described in detail with reference to the drawings, the embodiments are merely embodiments, and the present invention can be carried out with various modifications and improvements based on the knowledge of those skilled in the art.

NOMENCLATURE OF ELEMENTS

10: Vehicle
12: Engine
18: Automatic transmission
34: Exhaust pipe
40: Electronic throttle valve
44: Catalyst
48: Turbocharger
70: Electronic control apparatus (control apparatus)
74: Overheat-suppression control portion
78: Torque-down control portion
F: Fuel
EX: Exhaust gas
THcat: Catalyst temperature
THcatd: Lean-deterioration temperature value
THcat+Δ tcat: Estimated value of catalyst temperature
THcatmax: Upper-limit temperature value
THex: Exhaust gas temperature
THex+Δ tex: Estimated value of exhaust gas temperature
THexmax: Upper-limit temperature value

What is claimed is:

1. A control apparatus for a vehicle that includes a drive wheel, an engine and an automatic transmission configured to transmit power from the engine toward the drive wheel,
   wherein, when the automatic transmission is shifted, the control apparatus is configured to execute a shifting-time torque-down control by using one of an ignition retard method of retarding an ignition timing of the engine and a fuel cut method of restricting fuel supply to the engine, and
   wherein, when the shifting-time torque-down control is requested to be executed, the control apparatus is configured to estimate a temperature of a predetermined portion of an exhaust pipe of the engine in a case in which the shifting-time torque-down control is executed by using the ignition retard method, and to execute the shifting-time torque-down control by using the fuel cut method when an estimated value of the temperature of the predetermined portion of the exhaust pipe is not lower than a predetermined upper-limit temperature value.

2. The control apparatus according to claim 1,
   wherein, when executing the shifting-time torque-down control by using the fuel cut method, the control apparatus is configured to control an electronic throttle valve of the engine such that the electronic throttle valve is opened while the fuel supply is restricted.

3. The control apparatus according to claim 1, wherein the temperature of the predetermined portion of the exhaust pipe is a temperature of a catalyst provided in the exhaust pipe, and wherein, when a current value of the temperature of the catalyst is not lower than a predetermined deterioration temperature value at which deterioration of the catalyst is expected in a case in which the fuel cut method is used to execute the shifting-time torque-down control, the control apparatus is configured to execute the shifting-time torque-down control by using the ignition retard method regardless of whether the estimated value of the temperature is not lower than the upper-limit temperature value.

4. The control apparatus according to claim 1, wherein the temperature of the predetermined portion of the exhaust pipe includes a temperature of a catalyst provided in the exhaust pipe and a temperature of an exhaust gas which is exhausted from the exhaust pipe and which rotates a turbine of a turbocharger provided in the engine, wherein the control apparatus is configured to calculate an estimated value of the temperature of the catalyst and an estimated value of the temperature of the exhaust gas, and to determine whether or not the estimated values of the temperatures are not lower than the upper-limit temperature values separately predetermined for the catalyst and the exhaust gas, and wherein the control apparatus is configured to execute the shifting-time torque-down control by using the fuel cut method when at least one of the estimated values of the temperatures is not lower than a corresponding one of the upper-limit temperature values.

5. The control apparatus according to claim 1, comprising:

an overheat-suppression control portion configured to execute a fuel increase control for increasing an amount of the fuel supply to the engine in order to suppress overheating of the predetermined portion of the exhaust pipe when the temperature of the predetermined portion of the exhaust pipe reaches a predetermined overheat-determination temperature value, wherein the predetermined upper-limit temperature value is predetermined based on the overheat-determination temperature value such that execution of the fuel increase control by the overheat-suppression control portion is suppressed.

* * * * *